F. WETTEROTH.
GRASS CATCHER.
APPLICATION FILED DEC. 23, 1909.

955,567.

Patented Apr. 19, 1910.

WITNESSES:
Frank Hetlage Jr.
Maybelle Small

INVENTOR.
Frank Wetteroth
By
Small & Small
ATTORNEYS.

UNITED STATES PATENT OFFICE.

FRANK WETTEROTH, OF ST. LOUIS, MISSOURI, ASSIGNOR TO ZITTLOSEN MANUFACTURING COMPANY, OF ST. LOUIS, MISSOURI, A CORPORATION OF MISSOURI.

GRASS-CATCHER.

955,567.      Specification of Letters Patent.    Patented Apr. 19, 1910.

Application filed December 23, 1909. Serial No. 534,735.

*To all whom it may concern:*

Be it known that I, FRANK WETTEROTH, a citizen of the United States, residing at St. Louis, in the State of Missouri, have invented a new and useful Grass-Catcher, of which the following is a specification.

My invention relates to improvements in grass catchers in which a helical spring serves to retain opposed hooks or trunnions in engagement with suitable openings in the side plates of a lawn mower.

The chief advantages of my improved device, the latter hereinafter referred to as a receptacle, consist in a means for carrying the same easily in one hand when it is desired to remove the cut grass to some point distant from the lawn, and in disposing said carrying means in such manner that said receptacle is in no danger of tilting and so scattering the debris over lawn and walks; and a further and even more valuable feature consists in protecting the aforesaid spring, throughout its entire normal length, from physical damage and deterioration. In such devices it is well understood that said spring is not only the most important but the most delicate factor, and from an appreciation of that fact it will be apparent that my provision for housing the same in a strong metal sheath not susceptible to wear and hard usage, and without adding very materially to the cost of production of such an article, constitutes an important addition to the advancement of the art. These desideratums, and others which will become apparent hereafter and from a consideration of the appended claims, are attained through the peculiar features of construction hereinafter described in detail and illustrated in the accompanying drawing, therein like numerals denoting like parts throughout.

Figure 1:
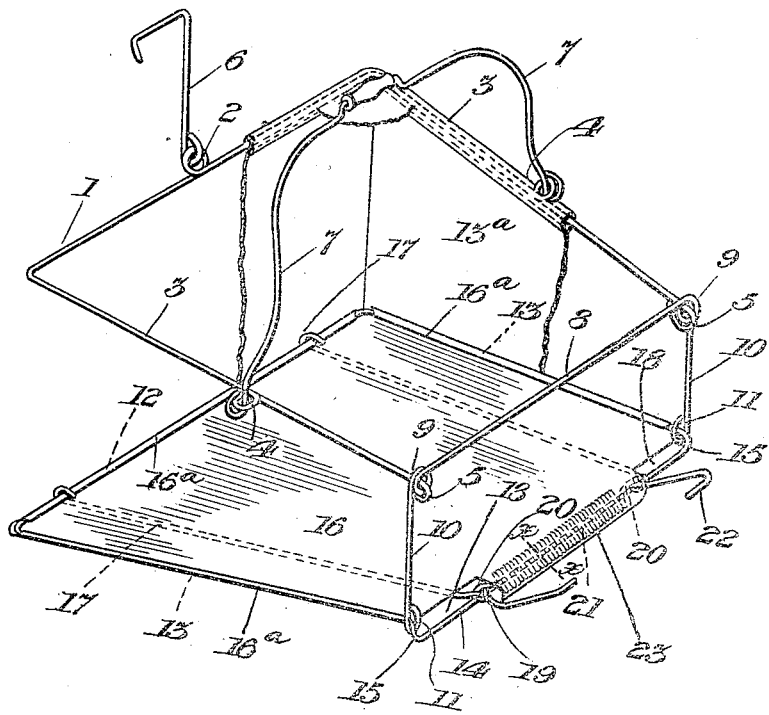
Figure 2:
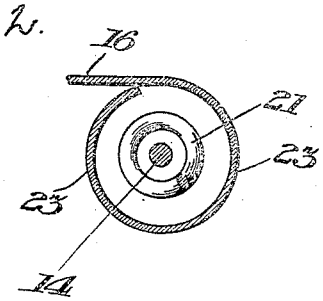

Figure 1 is a perspective of my receptacle completed save for its canvas sides and backs; and Fig. 2 a section along line *x—x* of Fig. 1, depicting the aforesaid spring completely incased in a cylinder formed from the metal of the floor of said receptacle.

What may properly be termed three distinct frames are embodied in this device: an upper, an intermediate, and a lower frame. Said upper frame, like the others, is formed of a rod of suitable material and bent to afford a rear-bar 1, having eyelet 2, and side rods 3, having opposite eyelets 4 disposed at their approximate center, said side-rods terminating forwardly in loops or eyelets 5. Eyelets 2, 4, and 5 are formed, as is apparent, by rebending upon itself the aforesaid metal rod; eyelet 2 fixing in definite position upon bar 1 a member 6 designed to engage the mower handle, while eyelets 4 are engaged with complementary loops at the termini of handle-stay 7. Having hinged connection with said top and bottom frames is said intermediate frame, comprising a front-stay 8 rebent at its opposite extremities to provide eyelets 9 from which continue, at right angles, stays 10 terminating in loops 11, the latter loosely engaging said bottom frame, while eyelets 9 engage loops 5. Said bottom frame comprises a rear bar 12 which is continued at right angles into side-rods 13, and from latter proceeds, at like angle, a supporting rod 14 which, however, sharply descends at point 15 from the normal horizontal plane of rods 13, thus providing a character of socket for loops 11; permitting the free collapse of said top and intermediate frames; and affording a bearing or supporting surface for reciprocally movable hooks subsequently mentioned. Over rear bar 12 and side-rods 13 is first positioned a margin of the canvas 13$^a$ usually employed to form the sides and back of such receptacles; subsequently thereover are bent edges 16$^a$ of the sheet of metal forming the floor of the device; and finally over said rear bar and said adjacent covering edge is bent one extremity of rods 17. From the latter point said rods extend under said floor and passing through slots 18 and over said supporting rod 14 are sharply crimped to provide sockets 19 for the retention of terminals 20 of a spring 21, and terminate in upwardly-struck hooks 22.

The floor of my grass catcher is preferably formed of a single piece of sheet metal 16 supported, as aforesaid, by the overlapping of certain of its edges upon rods 12 and 13, and forwardly said flooring is prolonged substantially beyond and above rod 14 and rebent thereabout to provide a hollow cylinder 23 which completely incases and shields from damage and deterioration spring 21.

The foregoing advantages of a carrying means and a housing for said spring are set forth and claimed in my application for patent filed October 18, 1909, but the construction of this present device being quite different from that described and claimed in said prior application, the following features are claimed as new:—

1. A receptacle of the character described, comprising an upper, a lower, and an intermediate frame, the latter member having hinged connection with said upper and lower frames, said upper and intermediate frames being collapsible; a rigid floor or bottom engaging certain portions of said lower frame; rods disposed beneath said floor, fixed at one of their extremities over a portion of said lower frame and oppositely terminating in hooks; a spring disposed between, and substantially controlling the position of, said rods; and a protective housing formed integral with said floor and incasing said spring.

2. A receptacle of the character described, comprising an upper, a lower, and an intermediate frame, the latter member having hinged connection with said upper and lower frames, said upper and intermediate frames being collapsible; a rigid floor or bottom in engagement with certain portions of said lower frame; reciprocally movable members disposed beneath said floor and terminating at one of their extremities therebeyond in opposed hooks; a spring engaging said members, and substantially controlling their reciprocal movement; a housing formed integral with said floor and said spring disposed within said housing.

3. A receptacle of the character described, comprising an upper, a lower, and an intermediate frame, the latter member having hinged connection with said upper and lower frames, said upper and intermediate frames being collapsible; a rigid floor or bottom in engagement with certain portions of said lower frame; reciprocally movable members disposed beneath said floor and terminating at one of their extremities therebeyond in opposed hooks; a spring engaging said members, and substantially controlling their reciprocal movement; a housing formed integral with said floor and said spring disposed within said housing; and a member of said lower frame disposed beneath the normal horizontal plane of the floor of said receptacle and its supporting rods, said member directed through the longitudinal extent of said spring and affording a bearing surface for said reciprocally movable members.

4. A receptacle of the character described, comprising an upper, a lower, and an intermediate frame, the latter member having hinged connection with said upper and lower frames, said upper and intermediate frames being collapsible; a rigid floor or bottom in engagement with certain portions of said lower frame; reciprocally movable members disposed beneath said floor and terminating at one of their extremities therebeyond in opposed hooks; a spring engaging said members, and substantially controlling their reciprocal movement; a housing formed integral with said floor and said spring disposed within said housing; a member of said lower frame disposed beneath the normal horizontal plane of the floor of said receptacle and its supporting rods, said member directed through the longitudinal extent of said spring and affording a bearing surface for said reciprocally movable members; and a means whereby said receptacle may be carried in the hand, said means so disposed as to maintain said floor in horizontal balance during such carriage.

FRANK WETTEROTH.

Witnesses:
   PAUL GROSSE,
   J. H. HAMILTON.